United States Patent Office 3,118,866
Patented Jan. 21, 1964

3,118,866
POLYETHYLENE COMPOSITION AND PROCESS OF CROSSLINKING
Razmic S. Gregorian, Silver Spring, Md., assignor to W. R. Grace & Co., New York, N.Y., a corporation of Connecticut
No Drawing. Filed Jan. 7, 1960, Ser. No. 946
7 Claims. (Cl. 260—94.9)

This invention relates to a novel method of crosslinking olefin polymers. More particularly, this invention is concerned with crosslinking polyethylene by subjecting ethylene polymer to the action of a novel class of peroxides at a temperature above the softening point of the polymer.

This invention is a continuation-in-part of my copending application having Serial Number 757,918, now abandoned.

Polymers of ethylene such as those described in U.S. 2,153,553 and in U.S. 2,816,883 are well known in the art today and are generally characterized by their organic solvent solubility and their thermoplastic properties. Lately, several methods have been tried with varying success to decrease the thermoplasticity and solubility by crosslinking the polymer. Such methods include electron impingement of the polymer and blending of free radical liberating substances into the polymer. In regard to the aforesaid latter method of polymer crosslinking the main class of compounds which have been utilized is organic peroxides. Although it is known that various organic peroxides will cause crosslinking upon admixture with polyethylene, many have been found lacking in certain regards. Thus, for example, benzoyl peroxide at the necessary blending temperatures is a hazard due to its capability to decompose violently. Still other peroxides are characterized by failing to have a decomposition temperature which is high enough to allow decomposition to take place at or above the softening point of the ethylene polymers. This is especially true of the high density polyethylene described in U.S. 2,816,883 which has a melting point of 127° C. or higher. Still other peroxides lack a sufficient half-life at the temperatures of incorporation into the softened ethylene polymer to permit uniform crosslinking therein.

It has now been found that bisperoxides having the general formula:

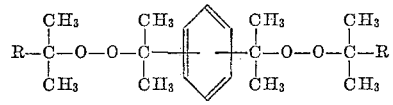

wherein R is a member of the group consisting of methyl and phenyl, are effective crosslinking agents for promoting the crosslinking of polyethylene. These bisperoxides promote crosslinking to a high degree at temperatures above the softening point of the ethylene polymer employed. The crosslinked polymer exhibits improved clarity and environmental stress cracking properties as will be shown hereinafter in the examples.

According to the instant invention the bisperoxides are operable with both high and low density polyethylene, i.e., having a density in the range 0.92–0.96.

Summarily, this invention relates a method of crosslinking polyethylene which comprises contacting a minor amount of a bisperoxide of the formula:

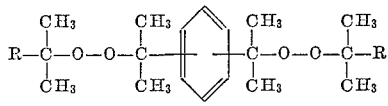

wherein R is a member of the group consisting of methyl and phenyl with a polymer of ethylene and crosslinking said polymer at a temperature above its softening point.

The following examples are set down to illustrate the invention and are not to be deemed as limiting its scope. Throughout the instant invention the melt indices (MI) were measured under the conditions specified in ASTMD 1238–52T, the densities of the polymer were measured in a density gradient tube by the Bell Laboratories Proposed ASTM Method for the Measurement of Density of Solid Plastics by the Density Gradient Technique, and the environmental stress-cracking data (ESC) was obtained using Igepal CO–630 (Antarox A400) an alkylaryl polyethylene glycol produced by General Dyestuff Corp., in accordance with the Proposed Tentative Method of Test for Environmental Stress-Cracking of Type 1 Ethylene Plastics (ASTM Designation: D00–59T) as disclosed in the 1959 preprint of the Report of Committee D–20 on Plastics, pp. 17–22 at the 62nd Annual Meeting of the ASTM, June 21–26, 1959. The clarity test devised specifically for evaluation of changes in the clarity of polyethylene due to crosslinking consists of viewing, through a ½" diameter hole centered in a horizontal sample table holding clarity test samples thereon, a glowing filament from a 2-watt concentrated arc lamp (point light source) the extreme tip of said filament being situated 3 inches below the bottom surface of said test sample. The test samples are prepared by molding under 10,000 lbs. pressure at 350° F. and then air cooled to room temperature. The results of the clarity test are expressed in terms of the clarity number (mils) which is defined as the maximum thickness of the sample in mils through which the glowing filament, as viewed from 1 foot above the sample table, can still be observed.

In all examples, unless otherwise noted, a Brabender Plastograph Model PL–V2 equipped with a recording unit for measuring changes in torque was used to admix the reactants and determine the degree of crosslinking. The aforesaid recording unit had a range of 0–1000 units equal to 0–1 kilogram-meter of torque. This range can be increased when necessary to 0–5000 i.e., equal to 0–5 kilogram-meters of torque by the addition of weights. However, other mechanisms, e.g., a Banbury mixer or a tape extruder, are equally operable in performing this invention.

The degree of crosslinking is related to the increase in torque ($\Delta \tau$) measured by the Plastograph recorder from the time the bisperoxide crosslinking agent is added to the fused polymer until the crosslinking reaction is discontinued. The greater the degree of crosslinking the greater the viscosity of the polyethylene which in turn requires a greater torque in order to drive the Plastograph at a constant r.p.m. The degree of crosslinking which can be accomplished by the instant invention is limited only by the ability of the mixing apparatus to overcome the torque caused by the crosslinking. Thus, by the present invention, polyethylene can be wholly crosslinked, if desired, under proper conditions and with proper equipment available.

A further check on the degree of crosslinking is the decrease in melt index due to crosslinking of the polyethylene since melt index varies inversely with viscosity which varies directly with degree of crosslinking, a lower melt index after crosslinking evidences that crosslinking occurred.

Unless otherwise noted, all parts and percentages are by weight in the examples.

*Example 1*

38 g. commercial polyethylene having a melt index of 0.7 and a density of 0.96 were charged over a 2 minute period to a Brabender Plastograph maintained at a temperature of 190° C. Following an 8 minute conditioning period to fuse the polymer, 1.0 cc. of a 20% solution of α,α,α',α'-tetramethyl isophthalyl di-t-butyl bisperoxide:

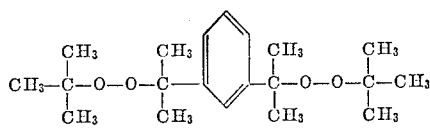

in benzene was added to the fused polymer and milling continued for 2 minutes. Δτ was 3780 units. The crosslinked polyethylene on characterization had a melt index of 0.07.

*Example 2*

38 g. commercial polyethylene in granule form having a melt index of 0.7 and a density of 0.96 were charged over a 4 minute period to a Brabender Plastograph maintained at a temperature of 150° C. After 14 minutes, 1.0 cc. of a 52% solution of α,α,α',α'-tetramethyl isophthalyl di-cumyl bisperoxide:

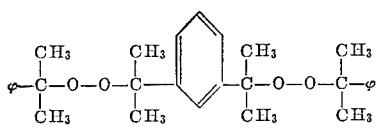

in benzene was added to the fused polyethylene and milling was continued for an additional 7 minutes at which time Δτ was 520 units. The thus-crosslinked polyethylene had a melt index of 0.00.

The crosslinking step of the instant invention is carried out at temperatures above the softening point. Temperatures up to 200° C. or even higher are operable so long as heat degradation of the polymer which is a function of temperature and time at temperature does not become a factor. For low density polyethylene (i.e., 0.92) a preferable temperature range for the crosslinking step is 100–200° C. and for high density polyethylene (i.e., 0.96) a preferable range is 150–200° C.

The amount of bisperoxide addition necessary to crosslink the ethylene polymer is relatively minor. Amounts in the range 0.001–10.0% based on the weight of the polyethylene charge are operable. A preferable range is 0.001 to 0.5% based on the weight of the polymer charge.

It should be understood that the bisperoxide can be added to the polyethylene and blended therewith at temperatures below the softening point of the polymer. However, it is preferable added to the fused polymer to obtain more uniform dispersion prior to decomposition of the bisperoxide.

The bisperoxides operable in this invention can be prepared by methods well known in the art. For example the acid method described in JACS 68, p. 1938 (1946), is preferably used to prepare ditertiary bisperoxides of the general formula:

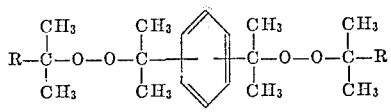

wherein R is a member of the group consisting of methyl and phenyl.

The crosslinked polyethylene produced by the instant invention can be used in many applications wherein polyethylene was used heretofore. The composition of the present invention is especially useful where polyethylene with improved clarity is necessary.

I claim:
1. A composition useful in the production of crosslinked polyethylene consisting essentially of polyethylene and 0.001–10% by weight of said polyethylene of a crosslinking agent of the formula

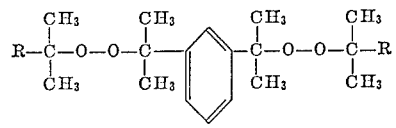

wherein R is a member of the group consisting of methyl and phenyl.

2. The composition according to claim 1 wherein the crosslinking agent is α,α,α',α'-tetramethyl isophthalyl di-t-butyl bisperoxide.

3. The composition according to claim 1 wherein the crosslinking agent is α,α,α',α'-tetramethyl isophthalyl di-cumyl bisperoxide.

4. The process which comprises admixing polyethylene and 0.001–10% by weight of said polyethylene of a crosslinking agent of the formula

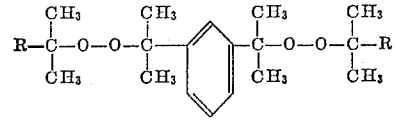

wherein R is selected from the group consisting of methyl and phenyl, and heating said admixture to effect crosslinking of said polyethylene.

5. The process according to claim 4 wherein the crosslinking agent is α,α,α',α'-tetramethyl isophthalyl di-t-butyl bisperoxide.

6. The process according to claim 4 wherein the crosslinking agent is α,α,α',α'-tetramethyl isophthalyl di-cumyl bisperoxide.

7. The process according to claim 4 wherein the crosslinking is effected at a temperature above the softening point of the polyethylene.

References Cited in the file of this patent
UNITED STATES PATENTS

| | | |
|---|---|---|
| 2,813,127 | White | Nov. 12, 1957 |
| 2,826,570 | Ivett | Mar. 11, 1958 |
| 2,888,424 | Precopio | May 26, 1959 |
| 2,916,481 | Gilmont | Dec. 8, 1959 |
| 2,957,030 | Bankert | Oct. 18, 1960 |